Patented Nov. 20, 1945

2,389,500

UNITED STATES PATENT OFFICE 2,389,500

MANUFACTURE OF AMINES

Roland H. Goshorn, Trenton, Mich., assignor to Sharples Chemicals Inc., Philadelphia, Pa., a corporation of Delaware No Drawing. Original application September 7, 1940, Serial No. 355,817. Divided and this application April 2, 1942, Serial No. 437,356

5 Claims. (Cl. 260—585)

The present invention pertains to the manufacture of amines. This application is a division of my prior application, Serial No. 355,817, filed September 7, 1940. The manufacture of mono-, di- and tri-alkyl amines by amination of alcohols and ethers is well known from the work of Sabatier, Smolenski and others. In the practice of such processes, using alcohol as the alkylating agent, for example, the alcohol is ordinarily passed in vapor phase, together with ammonia or an amine over a dehydrating catalyst, with the result that a mixture of mono-, di- and tri-alkyl amines is formed. It is frequently desirable that the reaction be conducted in such a way as to favor the formation of large proportions of poly-alkyl amines as compared to mono-alkyl amines, and a principal feature of the present invention consists in the fact that it provides a process by which a product containing a large proportion of the poly-alkyl amines may be obtained. While undesired mono-alkyl amines may be recycled to produce the desired poly-alkyl amines, a desirable economy is attained if the cost of such recycling can be minimized or avoided by forming an initial reaction mixture in which the poly-alkyl amines are favored if they are the product desired, and this the present invention accomplishes.

A large number of catalysts have been proposed for use in the practice of processes by which ammonia is alkylated to produce alkyl amines by vapor phase reaction with alcohols or ethers. Among such catalysts have been a large number of metal oxides and salts. Regardless of the catalyst chosen, the practice of the reaction results in the formation of substantial quantities of by-products, including nitriles and olefins. A further feature of the present invention is that it provides catalysts for the practice of vapor phase reactions of this type which result in formation of smaller quantities of olefins and nitriles than are obtained by the use of prior art catalysts, and which therefore enable us to obtain an improved yield of the desired amine.

Another difficulty encountered in the practice of processes of this character consists in the fact that only a small proportion of the materials passed over the catalyst reacts to form amines. An object of the present invention has accordingly been to provide catalysts which give excellent conversions of the raw materials into amines by accelerating the rate of reaction between the alkylating agent and ammonia, at the same time that they favor formation of large proportions of the poly-alkyl amines.

Still further objects of the invention will be evident from a reading of the following detailed specification.

In the practice of the invention, the alkylating agent, which may be either an alcohol or an ether, is passed, together with ammonia or an amine, over a catalyst which consists of a supporting material having a catalytic effect, this supporting material being coated or impregnated with silica, which acts as a dehydrating promoter or activator, and this dehydrating activator being in turn coated or combined with a catalyst promoter or activator chosen from the class of dehydrogenating and hydrogenating catalysts. As the supporting catalyst, a compound of one of the metals of groups II, III and IV of the periodic table is chosen, this compound being an oxide, carbonate, silicate, borate or phosphate of one of the metals of these three groups.

The supporting catalyst is preferably in the granular or pelleted form, as distinguished from inorganic gels of the compounds in question. Oxides of metals have been found to be the best catalysts for this purpose, and aluminum oxide catalysts in the form of granules, pellets, or lumps have given the best results, when used as supporting catalysts and coated with a silica dehydrating catalyst activator and a hydrogenating and dehydrogenating catalyst as discussed hereinafter.

The catalyst support is also coated with a hydrogenating and dehydrogenating catalyst, which serves to activate the catalyst support and speed up the reaction between the alcohol or ether and the ammonia. The hydrogenating and dehydrogenating catalyst chosen to effect this object may consist of an oxide of one of the metals of groups V, VI, VII and VIII of the periodic table or of one of the metals of these four groups. The very best catalysts, or catalyst promoters, for use in this connection have been found to be the oxides of chromium, nickel and cobalt. Thus, the preferred catalysts of the invention consist of granular alumina coated or impregnated with silica, which is in turn coated or impregnated with nickel oxide or chromic oxide. These catalysts have been found to be superior from the standpoint of conversion and yield, in the manufacture of poly-alkyl amines by reaction of ammonia with alcohols and ethers, to any catalyst described in the chemical literature.

In the preferred practice of the invention, the ammonia and alkylating agent are passed in vapor phase through a conduit containing a catalyst of the invention, these raw materials being heated to a temperature between 300 and 400° C. during passage through the conduit. Temperatures somewhat lower than 300° C. and somewhat higher than 400° C. may be employed, but best results are generally obtained within the range between 300 and 400° C.

While aluminum oxide in pellet or granular form and coated with silica, which is in turn coated with an oxide of chromium, nickel or cobalt, has been indicated above to be the preferred catalyst of the invention, the invention is by no means limited to these specific catalysts, since the supporting catalyst and/or the activating (hydrogenating and dehydrogenating) catalyst may be chosen from a large number of compounds, as indicated by the above general discussion. Suitable compounds for use as the supporting catalyst include magnesia, alumina, titanium oxide, thorium oxide, salts of these metals, and minerals containing these oxides or the corresponding salts. Suitable activating catalysts, in addition to the oxides of chromium and nickel, which are the best, include the oxides of magnesium, molybdenum, cadmium, cobalt, iron, tungsten, zinc, silver, palladium and platinum, or combinations between two or more of these activators.

In the preparation of the catalysts of the invention, the supporting catalyst may be impregnated with a salt containing silicon. The material with which the supporting catalyst has been impregnated may then be decomposed to leave a precipitate of silica as a coating on the supporting catalyst. The coated supporting catalyst may then be again impregnated with a salt of the metallic element of the activating catalyst or promoter (hydrogenating and dehydrogenating) catalyst. Water may then be evaporated from the resulting product, and the product resulting from this treatment may then be further treated to effect decomposition of the salt and formation of the metal oxide in case a metal oxide is used as the promoting or activating (hydrogenating and dehydrogenating) catalyst. Thus, in the manufacture of a catalyst which consists of alumina coated with silica, which is in turn coated with nickel oxide, the alumina is first suspended in a solution of sodium silicate. Nitric acid is then added to the suspension to precipitate silica on the alumina, and the precipitate is then removed from the solution by filtration or gravity subsidence. The silica on alumina, obtained in this way, is washed with water and then dried under vacuum at elevated temperature. It is then suspended in a nickel nitrate solution and thus impregnated with the solution. The water is then evaporated under vacuum, and the coated particles are put in the reaction tube in which they are later to be used in the performance of the amination reaction. They are heated in this tube to a temperature of approximately 400° C. to decompose the nickel nitrate, forming nickel oxide and oxides of nitrogen. These oxides of nitrogen, being volatile, are driven off, leaving the alumina coated with the nickel oxide promoting catalyst. At the conclusion of these operations, the alkylating agent which may, for example, be methyl, ethyl, propyl, butyl, amyl, etc. alcohol or ether, is passed, together with a molecular excess of ammonia, over the resulting composite catalyst, while the conduit containing the catalyst is heated to a temperature sufficient to cause heating of the gases passed through the mixture to the desired reaction temperature.

The following examples indicate the great superiority of the catalysts of the present invention over the prior art in favoring production of poly-alkyl amines. Comparison of these examples with examples of my concurrent application, Serial No. 437,355, which is, in a sense, complementary to this application in that it favors formation of mono-alkyl amines, will illustrate the extent to which the processes of these two applications promote formation of the respective desired type of amine as contrasted with the less desired type.

*Example I*

100 pounds of Alorco activated alumina (8–14 mesh), was charged to a 20 gallon ceramic crock which was provided with a gasketed steel cover. The crock was set in a steam heated water bath consisting of a half section of a 50 gallon drum having a sparger steam line at the bottom. The alumina was heated for six hours under vacuum in the crock.

The alumina was then cooled, and while it was still under vacuum, a solution containing 23 pounds of 40% sodium silicate in 65 pounds of water was added. The vacuum was released and the mixture stirred thoroughly with a wooden paddle.

A solution containing 7.3 pounds of 70% nitric acid in 15 pounds of water, was added rapidly with constant stirring. The catalyst was then washed by a continuous stream of water fed to the bottom of the crock by means of a glass tube until the water was free of nitric acid. After washing, the catalyst was placed in the catalyst drier and heated under vacuum to remove the bulk of the water and then completely dried by heating to 400° C. under atmospheric pressure.

412 grams of the silica coated alumina, produced as described above, was heated under vacuum on a water bath for about three hours and then allowed to cool for an hour. 400 milliliters of water, containing 25 grams of chromium nitrate in solution were then introduced.

After addition of this solution, the vacuum was released and the mixture was allowed to stand over night. The excess water was then evaporated by heating under vacuum over a water bath, with occasional shaking. The resulting dry material was heated at 400° C. for approximately one and one-half hours while a slow stream of air was passed over it.

The resulting catalyst, consisting of alumina, coated with silica, which was in turn coated with chromic oxide, was placed in a glass tube, and a vaporized mixture of ammonia and butyl alcohol containing a ratio of 4.04 moles of ammonia to each mole of butyl alcohol, was passed over the catalyst at a space velocity of 1060 and an average temperature of 330° C., to effect alkylation of the ammonia. Upon analysis of the reaction mixture passing from the tube, it was found that 25.5% of the alcohol had reacted with the ammonia to produce mono-butyl amine and 17.3% to produce di-butyl amine, making a total of 42.8% conversion of alcohol to amine. The yield of the desired amines obtained in the practice of the process was 42.8% mono-butyl amine and 29.0% di-butyl amine, making a total yield of 71.8%.

*Example II*

A catalyst consisting of chromic oxide deposited upon silica, which was in turn deposited upon activated alumina, was prepared in the same manner as discussed in Example I, above. A vaporized mixture of ammonia and butyl alcohol in the ratio of 3.91 moles of ammonia to each mole of butyl alcohol was passed over the catalyst at a space velocity of 1070 and an average temperature of 340° C. to effect alkylation of the ammonia. Upon analysis of the reaction mixture passing from the tube, it was found that 27.3% of the alcohol had reacted with ammonia to produce mono-butyl amine and 20.0% to produce di-butyl amine, making a total of 47.3% conversion of alcohol to amine. The yield of the desired amine obtained in the practice of the process was 43.3% mono-butyl amine and 31.6% di-butyl amine, making a total yield of 74.9%.

*Example III*

A catalyst consisting of vanadium oxide deposited on silica, which was in turn deposited on alumina, was prepared in the same general manner discussed under Example I, above. A vapor phase mixture of butyl alcohol and ammonia containing 3.91 moles of ammonia to each mole of butyl alcohol was passed over the catalyst at a space velocity of 1020 and an average temperature of 347° C. Upon analysis of the reaction mixture, it was found that the conversion of the alcohol to mono-butyl amine was 24.9% and the conversion to di-butyl amine was 29.2%, making a total conversion of 54.1%. The yields of mono-butyl amine and di-butyl amine were 29.7 and 34.9%, respectively.

*Example IV*

A catalyst consisting of nickel oxide deposited on silica, which was in turn deposited on alumina, was prepared in the same general manner discussed under Example I, above. A vapor phase mixture of butyl alcohol and ammonia containing a ratio of ammonia to butyl alcohol of 4.18:1 was passed at a space velocity of 1050 and an average temperature of 350° C. over the catalyst. The conversion of the alcohol to mono-butyl amine was 27.0% and to di-butyl amine 24.2%, making a total conversion of 51.2%. The yields of mono- and di-butyl amines were 38.3% and 34.3%, respectively, making a total yield of 72.6%, based on the alcohol of the reaction mixture.

The use of catalysts described herein which contain vanadium and molybdenum oxides is covered in co-pending applications Serial Nos. 511,592 and 511,593, respectively, both filed on November 24, 1943.

Various modifications are possible within the scope of the invention, and I do not therefore wish to be limited except by the scope of the following claims.

I claim:

1. In the manufacture of amines, the process favoring production of a high ratio of poly-alkyl amines to mono-alkyl amine comprising passing a compound of the formula ROR', in which R represents an alkyl radical having from one to five carbon atoms and R' represents a member from the group consisting of hydrogen and alkyl radicals having from one to five carbon atoms, together with ammonia through a conduit containing a dehydrating catalyst chosen from the class consisting of salts and oxides of magnesium, aluminum, titanium and thorium, coated with silica, and with a hydrogenating and dehydrogenating catalyst chosen from the class consisting of oxides of chromium, nickel and cobalt, while heating the mixture to a temperature between the initial reaction temperature and the decomposition temperature of the formed amine.

2. In the manufacture of amines, the process favoring production of a high ratio of poly-alkyl amines to mono-alkyl amine comprising passing a compound of the formula ROR', in which R represents an alkyl radical having from one to five carbon atoms and R' represents a member from the group consisting of hydrogen and alkyl radicals having from one to five carbon atoms, together with ammonia through a conduit containing alumina coated with silica and in turn coated with an oxide of chromium, while heating the mixture to a temperature between the initial reaction temperature and the decomposition temperature of the formed amine.

3. In the manufacture of amines, the process favoring production of a high ratio of poly-alkyl amines to mono-alkyl amine comprising passing a compound of the formula ROR', in which R represents an alkyl radical having from one to five carbon atoms and R' represents a member from the group consisting of hydrogen and alkyl radicals having from one to five carbon atoms, together with ammonia through a conduit containing alumina coated with silica and in turn coated with an oxide of nickel, while heating the mixture to a temperature between the initial reaction temperature and the decomposition temperature of the formed amine.

4. In the manufacture of amines, the process favoring production of a high ratio of poly-alkyl amines to mono-alkyl amine comprising passing a compound of the formula ROR', in which R represents an alkyl radical having from one to five carbon atoms and R' represents a member from the group consisting of hydrogen and alkyl radicals having from one to five carbon atoms, together with ammonia through a conduit containing alumina coated with silica and in turn coated with an oxide of cobalt, while heating the mixture to a temperature between the initial reaction temperature and the decomposition temperature of the formed amine.

5. In the manufacture of amines, the process favoring production of a high ratio of poly-alkyl amines to mono-alkyl amine comprising passing an unsubstituted aliphatic alcohol having from 1 to 5 carbon atoms together with ammonia through a conduit containing alumina coated with silica and in turn coated with an oxide of chromium, while heating the mixture to a temperature between the initial reaction temperature and the decomposition temperature of the formed amine.

ROLAND H. GOSHORN.